US012676331B2

(12) United States Patent
Kim et al.

(10) Patent No.: US 12,676,331 B2
(45) Date of Patent: Jul. 7, 2026

(54) METHOD AND DEVICE FOR SEALING ELECTRODE ASSEMBLY

(71) Applicant: LG Energy Solution, Ltd., Seoul (KR)

(72) Inventors: Jeong Yeon Kim, Daejeon (KR); Ji Hun Hwang, Daejeon (KR); Yoon Bong Wi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 219 days.

(21) Appl. No.: 18/564,351

(22) PCT Filed: Dec. 2, 2022

(86) PCT No.: PCT/KR2022/019521
§ 371 (c)(1),
(2) Date: Nov. 27, 2023

(87) PCT Pub. No.: WO2023/113329
PCT Pub. Date: Jun. 22, 2023

(65) Prior Publication Data
US 2024/0379987 A1 Nov. 14, 2024

(30) Foreign Application Priority Data
Dec. 17, 2021 (KR) ........................ 10-2021-0182155

(51) Int. Cl.
*B32B 37/06* (2006.01)
*H01M 4/04* (2006.01)
*H01M 10/04* (2006.01)

(52) U.S. Cl.
CPC ......... *H01M 10/0404* (2013.01); *B32B 37/06* (2013.01); *H01M 4/0471* (2013.01); *H01M 10/0463* (2013.01); *B32B 2457/10* (2013.01)

(58) Field of Classification Search
CPC ....... H01M 4/0471; H01M 4/04; B32B 37/06; B32B 2457/10; Y02E 60/10
See application file for complete search history.

(56) References Cited

U.S. PATENT DOCUMENTS 5,778,515 A * 7/1998 Menon ................ H01M 10/052
156/308.6
2004/0107564 A1 6/2004 Kurimoto et al.
(Continued)

FOREIGN PATENT DOCUMENTS

JP H01122574 A 5/1989
JP H05258739 A 10/1993
(Continued)

OTHER PUBLICATIONS

English machine translation for JP2017220306 (Year: 2017).*
(Continued)

*Primary Examiner* — Scott W Dodds
(74) *Attorney, Agent, or Firm* — Lerner David LLP

(57) ABSTRACT
A method and device for sealing an electrode assembly, which includes a plurality of electrodes stacked alternately with a separator therebetween, include a nest that supports the electrode assembly and a hot air blower that blows hot air toward a corner portion of the electrode assembly to seal the corner portion in a non-contact manner. The sealing may be performed in a non-contact method to minimize the impact on or damage to the electrode assembly other than the portions or regions to be sealed, which is typically caused by physical contact during the sealing process. Moreover, conditions for performing the sealing may be controlled to adaptively secure uniform and stable sealing quality.

6 Claims, 5 Drawing Sheets

(56) References Cited

U.S. PATENT DOCUMENTS

| | | | |
|---|---|---|---|
| 2007/0154790 A1 | 7/2007 | Jeung et al. | |
| 2011/0076544 A1* | 3/2011 | Maeda | H01M 10/0525 429/136 |
| 2012/0295158 A1* | 11/2012 | Tanaka | H01M 50/46 429/211 |
| 2018/0083310 A1 | 3/2018 | Iwasaki et al. | |
| 2018/0115013 A1* | 4/2018 | Matsumoto | B32B 37/06 |

FOREIGN PATENT DOCUMENTS

| | | | | |
|---|---|---|---|---|
| JP | 2671387 B2 | 10/1997 | | |
| JP | H10064506 A | 3/1998 | | |
| JP | 2004286975 A | * 10/2004 | | |
| JP | 2012069283 A | 4/2012 | | |
| JP | 5325332 B1 | * 10/2013 | | H01M 4/0404 |
| JP | 2014086265 A | 5/2014 | | |
| JP | 2016146270 A | 8/2016 | | |
| JP | 2017220306 A | * 12/2017 | | |
| JP | 2018049716 A | 3/2018 | | |
| JP | 6351930 B2 | 7/2018 | | |
| JP | 2018116823 A | 7/2018 | | |
| JP | 2018174079 A | 11/2018 | | |
| JP | 2019016435 A | 1/2019 | | |
| JP | 2019029065 A | 2/2019 | | |
| JP | 2019121454 A | 7/2019 | | |
| JP | 6620068 B2 | 12/2019 | | |
| KR | 20070073169 A | 7/2007 | | |
| KR | 100814541 B1 | 3/2008 | | |
| KR | 20110044954 A | 5/2011 | | |
| KR | 20120052041 A | 5/2012 | | |
| KR | 20150125700 A | 11/2015 | | |
| KR | 101765371 B1 | 8/2017 | | |
| KR | 20180057847 A | 5/2018 | | |
| KR | 20180092051 A | 8/2018 | | |
| KR | 20180128770 A | 12/2018 | | |
| KR | 102139493 B1 | 7/2020 | | |
| KR | 20200113067 A | * 10/2020 | | F26B 21/50 |

OTHER PUBLICATIONS

English machine translation of JP2004286975 (Year: 2004).*

English machine translation of JP5325332 (Year: 2013).*

English machine translation of JP2019016435 (original cited in Mar. 5, 2025 IDS) (Year: 2019).*

English machine translation of KR20200113067 (Year: 2020).*

Extended European Search Report including Written Opinion for Application No. 22907798.7 dated Mar. 21, 25, pp. 1-11.

International Search Report for PCT/KR2022/019521 mailed Mar. 20, 2023. 3 pages.

* cited by examiner

METHOD AND DEVICE FOR SEALING ELECTRODE ASSEMBLY

TECHNICAL FIELD

Cross-Reference to Related Applications

The present application is a national phase entry under 35 U.S.C. § 371 of International Application No. PCT/KR2022/019521 filed on Dec. 2, 2022, which claims the benefit of the priority of Korean Patent Application No. 10-2021-0182155, filed on Dec. 17, 2021, which is hereby incorporated by reference in its entirety.

TECHNICAL FIELD

The present disclosure relates to a method for sealing an electrode assembly, and a device for sealing an electrode assembly.

BACKGROUND ART

According to a need for energy sources as alternatives to oil energy causing environmental pollution, research on and development for power generation based on energy sources such as solar heat, water power, wind power, ocean energy, and biomass energy, which have little impact on the environmental pollution, are carried out. In particular, researches on secondary batteries that can be repeatedly charged are actively carried out, and development is carried out on aspects such as the materials, efficiency, structures, and stability of the secondary batteries.

In order to produce secondary batteries, various processes are performed, and processes are applied which correspond to various types of the secondary batteries, such as a pouch type, a prismatic type or a cylindrical type. In general, the secondary batteries are produced through processes such as an electrode process, an assembly process and a formation process, and processes to be performed may be different according to the types of the secondary batteries. In particular, with respect to the assembly process, a winding process, a stacking process, a folding process and so on are performed.

In the assembly process of the secondary batteries, sealing for assembling and sealing the secondary batteries is performed, and the sealing is performed generally in such a way that a sealing block having a set temperature is in contact with a sealing region to thermally fuse the sealing region under a set pressure.

According to the related art, however, the sealing block is in physical contact with the sealing region to perform the sealing. Accordingly, heat may be applied to an unintended region or an impact may be applied to an object other than an object to be sealed.

DISCLOSURE OF THE INVENTION

Technical Problem

An object to be solved by the present disclosure is to provide a sealing method, which is capable of sealing an object to be sealed or a sealing region without physical contact and controlling conditions for the sealing to secure sealing quality, and a sealing device for such sealing.

Technical Solution

A method for sealing an electrode assembly, which includes a plurality of electrodes stacked alternately with a separator therebetween, according to an embodiment of the present invention may include seating the electrode assembly on a nest, and sealing the electrode assembly by blowing hot air toward a corner portion of the electrode assembly.

In the sealing, a hot air blower including a nozzle may be used to blow the hot air toward the corner portion.

In the method, the hot air blower may adjust at least one of a temperature, pressure, blow time, or blow angle of the hot air.

The method may further include moving the hot air blower toward the corner portion of the electrode assembly by using a driver before the sealing process.

In the method, the driver may adjust a distance between the hot air blower and the corner portion.

In the method, the electrode assembly may include long sides parallel to a first direction and short sides parallel to a second direction perpendicular to the first direction. The method may include adjusting a blow angle of the hot air with respect to the first direction and the second direction.

In the method, the corner portion may be provided in plurality, and a plurality of hot air blowers corresponding to the number of the plurality of corner portions may be used to blow the hot air.

A device for sealing an electrode assembly, which includes a plurality of electrodes stacked alternately with a separator therebetween, according to another embodiment of the present invention may include a nest that supports the electrode assembly, and a hot air blower that blows hot air toward a corner portion of the electrode assembly to seal the corner portion in a non-contact state.

The hot air blower may include a main body, and a nozzle of which an angle with respect to the main body is variable.

The device may further include a driver that moves the hot air blower with respect to the corner portion.

The hot air blower may adjust at least one of a temperature, pressure, blow time, or blow angle of the hot air.

The electrode assembly may include long sides parallel to a first direction and short sides parallel to a second direction perpendicular to the first direction. The hot air blower may control the nozzle to adjust a blow angle of the hot air with respect to the first direction and the second direction.

Advantageous Effects

According to the embodiments of the present invention, the sealing may be performed in the non-contact method to minimize the impact or damage on the portion other than the object to be sealed or the sealing region, which may be caused by the physical contact during the sealing.

According to the embodiments of the present invention, the conditions for performing the sealing may be controlled according to the situations to adaptively secure the uniform and stable sealing quality.

MODE FOR CARRYING OUT THE INVENTION

Figure 1:
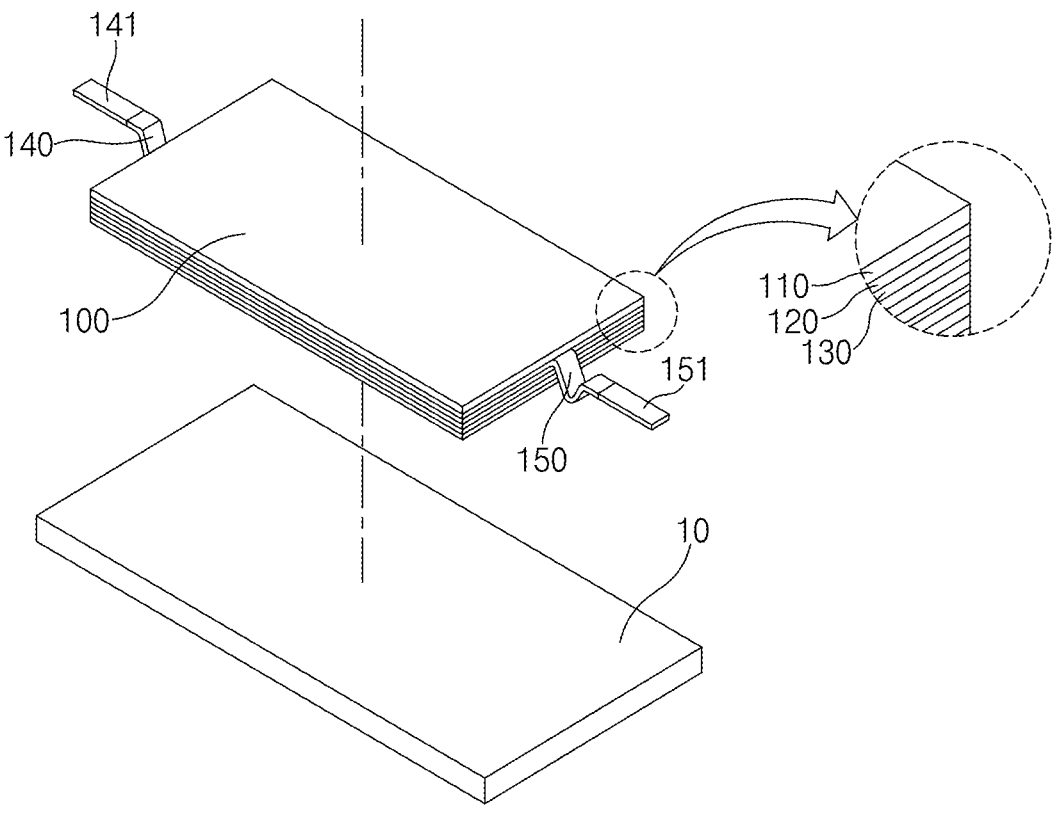
FIG. 1 is a view illustrating an electrode assembly according to an embodiment of the present invention and arrangement of the electrode assembly.

Hereinafter, preferred embodiments of the present invention will be described in detail with reference to the accompanying drawings to enable those skilled in the art to which the present disclosure pertains to easily carry out the embodiments of the present invention. The present invention may, however, be embodied in different forms and should not be construed as limited by the embodiments set forth herein.

The parts unrelated to the description, or the detailed descriptions of related well-known art that may unnecessarily obscure subject matters of the present disclosure, will be ruled out in order to clearly describe the embodiments of the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her invention in the best ways.

FIG. 1 illustrates an electrode assembly 100 according to an embodiment of the present invention and arrangement of the electrode assembly 100.

The electrode assembly 100 may include a negative electrode 110, a separator 120, and a positive electrode 130. For example, the electrode assembly 100 may include the electrodes stacked alternately with the separator 120 therebetween. The electrodes may include a plurality of negative electrodes 110 and a plurality of positive electrodes 130.

The electrode assembly 100 may include a negative electrode tab 140 and a negative electrode lead 141. For example, the plurality of negative electrodes 110 of the electrode assembly 100 may be electrically connected to the negative electrode tab 140. The negative electrode tab 140 may be electrically connected to the negative electrode lead 141, and the negative electrode lead 141 may be electrically connected to the outside of the electrode assembly 100. As the plurality of negative electrodes 110 of the electrode assembly 100 are electrically connected negative electrode tab 140 and the negative electrode lead 141, the plurality of negative electrodes 110 may be electrically connected to the outside of the electrode assembly 100.

The electrode assembly 100 may include a positive electrode tab 150 and a positive electrode lead 151. For example, the plurality of positive electrodes 130 of the electrode assembly 100 may be electrically connected to the positive electrode tab 150. The positive electrode tab 150 may be electrically connected to the positive electrode lead 151, and the positive electrode lead 151 may be electrically connected to the outside of the electrode assembly 100. As the plurality of positive electrodes 130 of the electrode assembly 100 are electrically connected to the positive electrode tab 150 and the positive electrode lead 151, the plurality of positive electrodes 130 may be electrically connected to the outside of the electrode assembly 100.

The electrode assembly 100 may include corner portions 301, 302, 303 and 304. For example, the electrode assembly

100 may include long sides parallel to a first direction and short sides parallel to a second direction perpendicular to the first direction. The corner portions 301, 302, 303 and 304 may mean portions at which that the long sides meet the short sides, respectively. For another example, four corner portions may be formed when the electrode assembly 100 has a shape corresponding to a rectangle having four sides (or edges) when viewed from an upper side. For still another example, when the electrode assembly 100 has a shape corresponding to a hexahedron, four sides (or edges), each of which connects two surfaces facing each other, may be the corner portions.

The sealing of the electrode assembly 100 may be performed based on a sealing device.

The sealing device may include a nest 10. For example, the electrode assembly 100 may be disposed on the nest 10. When the sealing device performs the sealing, the sealing of the electrode assembly 100 may be performed in a state in which the electrode assembly 100 is disposed on the nest 10.

The sealing device may include hot air blowers 310, 320, 330 and 340, and the sealing device may control the hot air blowers 310, 320, 330 and 340. The hot air blowers will be described later with reference to FIGS. 2 to 5.

Figure 2:
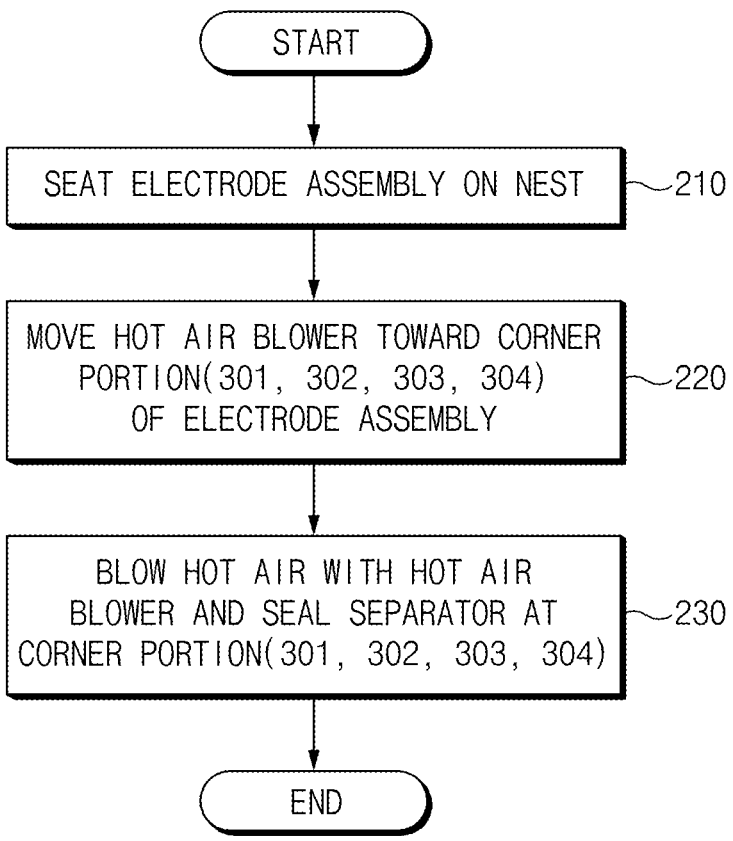
FIG. 2 is a flowchart illustrating a method for sealing an electrode assembly according to another embodiment of the present invention.

FIG. 2 illustrates a flowchart of a method for sealing an electrode assembly 100 according to another embodiment of the present invention.

According to a process 210, the electrode assembly 100 may be seated on a nest 10.

The sealing may be performed in a state in which the electrode assembly 100 is seated on the nest 10 of a sealing device. However, an embodiment of the present invention is not limited thereto.

According to a process 220, hot air blowers 310, 320, 330 and 340 may be moved toward corner portions 301, 302, 303 and 304, respectively, of the electrode assembly 100.

The sealing device may include the hot air blowers 310, 320, 330 and 340.

The sealing device may control the hot air blowers 310, 320, 330 and 340 so that the hot air blowers 310, 320, 330 and 340 are moved close to the corner portions 301, 302, 303 and 304 of the electrode assembly 100, respectively. The sealing device may control the hot air blowers 310, 320, 330 and 340 so that the hot air blowers 310, 320, 330 and 340 are moved far away from the corner portions 301, 302, 303 and 304 of the electrode assembly 100, respectively.

The sealing device may be provided with a plurality of hot air blowers 310, 320, 330 and 340. For example, the hot air blowers 310, 320, 330 and 340 corresponding to the number of the corner portions 301, 302, 303 and 304 of the electrode assembly 100 may be provided.

The sealing device may include a driver.

The sealing device may use (or control) the driver to control movement of the hot air blowers 310, 320, 330 and 340. For example, the sealing device may use the driver to move the hot air blowers 310, 320, 330 and 340 toward the corner portions 301, 302, 303 and 304, respectively, of the electrode assembly 100. For another example, the sealing device may use the driver to move the hot air blowers 310, 320, 330 and 340 to be far away from the corner portions 301, 302, 303 and 304, respectively, of the electrode assembly 100. For still another example, the sealing device may use the driver to adjust distances between the hot air blowers 310, 320, 330 and 340 and the corner portions 301, 302, 303 and 304, respectively.

The sealing device may be provided with a plurality of drivers. For example, the sealing device may include the

5 | 6 drivers corresponding to the number of the corner portions 301, 302, 303 and 304 of the electrode assembly 100.

The sealing device may control the plurality of drivers simultaneously, or may control the plurality of drivers separately. For example, the sealing device may control the plurality of drivers simultaneously and control the movement of the hot air blowers 310, 320, 330 and 340 simultaneously. For another example, the sealing device may use the plurality of drivers corresponding to the hot air blowers 310, 320, 330 and 340, respectively, and control the movement of the hot air blowers 310, 320, 330 and 340 separately.

According to a process 230, the hot air blowers 310, 320, 330 and 340 may be used to blow hot air and seal a separator at each of the corner portions 301, 302, 303 and 304. The hot air blowers 310, 320, 330 and 340 may blow the hot air.

The hot air blowers 310, 320, 330 and 340 may at least include main bodies 311, 321, 331 and 341 and nozzles 312, 322, 332 and 342, respectively.

The hot air blowers 310, 320, 330 and 340 may control the hot air and the nozzles 312, 322, 332 and 342, respectively. For example, the hot air blowers 310, 320, 330 and 340 may adjust at least one of a temperature, pressure, or blow time of the hot air. For another example, the hot air blowers 310, 320, 330 and 340 may control the nozzles 312, 322, 332 and 342 to adjust blow angles, respectively.

The angles of the nozzles 312, 322, 332 and 342 with respect to the main bodies 311, 321, 331 and 341, respectively, may be variable. For example, as the hot air blowers 310, 320, 330 and 340 adjust the blow angles of the nozzles 312, 322, 332 and 342, respectively, the angles of the nozzles 312, 322, 332 and 342 with respect to the main bodies 311, 321, 331 and 341, respectively, may change.

The hot air blowers 310, 320, 330 and 340 may use the nozzles 312, 322, 332 and 342 to blow the hot air toward the corner portions 301, 302, 303 and 304 of the electrode assembly 100, respectively. For example, the hot air blowers 310, 320, 330 and 340 may adjust at least one of a temperature, pressure, or blow time of the hot air to be blown, and the hot air blowers 310, 320, 330 and 340 may blow the hot air, of which the at least one of the temperature, pressure, or blow time has been adjusted, toward the corner portions 301, 302, 303 and 304, respectively. For another example, the hot air blowers 310, 320, 330 and 340 may adjust the blow angles so that the nozzles 312, 322, 332 and 342 face the corner portions 301, 302, 303 and 304, respectively, and the hot air blowers 310, 320, 330 and 340 may blow the hot air toward the corner portions 301, 302, 303 and 304 through the nozzles 312, 322, 332 and 342 at the adjusted blow angles, respectively.

The adjusting (controlling) of the hot air and the nozzles 312, 322, 332 and 342 of the hot air blowers 310, 320, 330 and 340 may be performed in real time even during the blowing of the hot air.

The hot air blowers 310, 320, 330 and 340 (or the main bodies 311, 321, 331 and 341) may be electrically connected to the driver. For example, the controlling of the hot air and the nozzles 312, 322, 332 and 342 of the hot air blowers 310, 320, 330 and 340, which is described above, may be performed by the driver.

The corner portions 301, 302, 303 and 304 may each include a portion of the separator 130, and the portion of the separator 130 may be sealed by the hot air. For example, the portion of the separator 130 may be melted by the hot air, and the melted portion of the separator 130 may be pressed to seal each of the corner portions 301, 302, 303 and 304 of the electrode assembly 100.

According to the foregoing, the sealing device may use the hot air blowers 310, 320, 330 and 340 to seal, in a non-contact the portions of the separator 130 that correspond to the corner portions 301, 302, 303 and 304 of the electrode assembly 100, respectively, and minimize a damage of the electrode and other components during the non-contact sealing.

Figure 3:
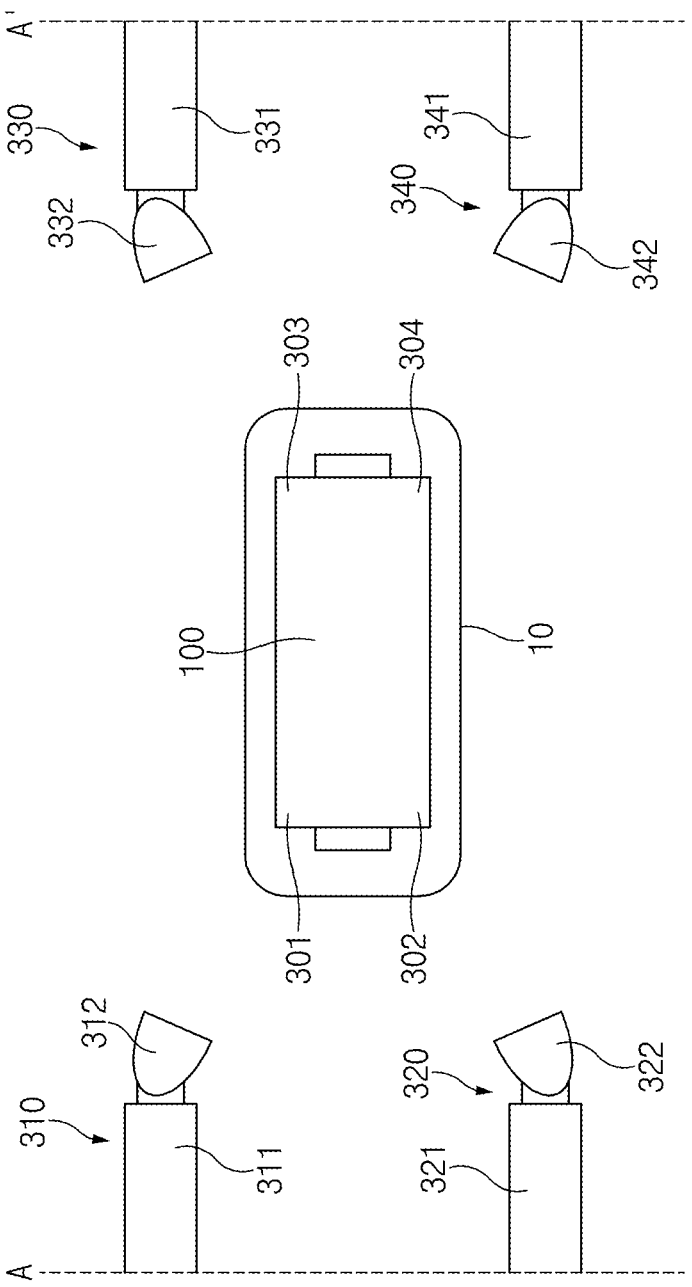
FIG. 3 is a view illustrating some processes of a method for sealing an electrode assembly according to an embodiment of the present invention.

FIG. 3 illustrates some processes of a method for sealing an electrode assembly according to an embodiment of the present invention.

An electrode assembly 100 may be in a state of being seated on a nest 10.

The electrode assembly 100 may include electrodes, which are stacked alternately with a separator 120 therebetween and include a plurality of negative electrodes 110 and a plurality of positive electrodes 130.

The electrode assembly 100 may include a plurality of corner portions 301, 302, 303 and 304. For example, the electrode assembly 100 may include a first corner portion 301, a second corner portion 302, a third corner portion 303 and a fourth corner portion 304.

The plurality of corner portions 301, 302, 303 and 304 may each include a portion of the separator 120. In more detail, the separator 120 may protrude outward from the negative electrodes 110 and the positive electrodes 130 and constitute the perimeter of the electrode assembly 100, particularly the plurality of corner portions 301, 302, 303 and 304.

For example, the first corner portion 301 may include a portion of the separator 120, which corresponds to the first corner portion 301. For another example, the second corner portion 302, the third corner portion 303, and the fourth corner portion 304 may include portions of the separator 120, which correspond to the second corner portion 302, the third corner portion 303, and the fourth corner portion 304, respectively.

Hot air blowers 310, 320, 330 and 340 may be on standby (in preparation) at positions corresponding to the plurality of corner portions 301, 302, 303 and 304, respectively. For example, each of the first hot air blower 310 and the second air blower 320 may be on standby at a position corresponding to a standby line (e.g., a line A). For another example, each of the third hot air blower 330 and the fourth air blower 340 may be on standby at a position corresponding to a standby line (e.g., a line A'). The foregoing standby lines are examples. The hot air blowers 310, 320, 330 and 340 may be disposed apart from the plurality of corner portions 301, 302, 303 and 304, respectively, and are not limited to the examples.

Figure 4:
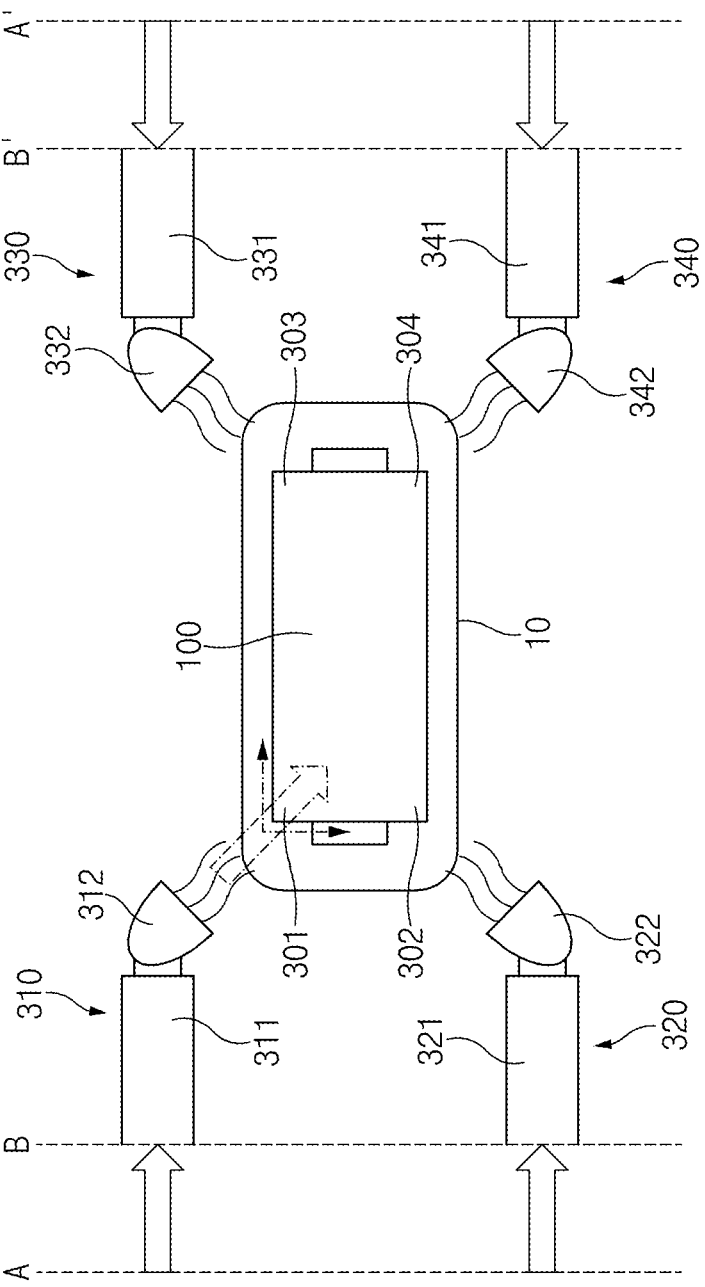
FIG. 4 is a view illustrating a sealing process of a method for sealing an electrode assembly according to an embodiment of the present invention.

FIG. 4 illustrates a sealing process of a method for sealing an electrode assembly according to an embodiment of the present invention.

The hot air blowers 310, 320, 330 and 340 may move to be close to the plurality of corner portions 301, 302, 303 and 304 from the positions (or standby positions), respectively, each of which corresponds to the standby line (e.g., the line A or the line A').

A sealing device may use a driver to move the hot air blowers 310, 320, 330 and 340 to be close to the plurality of corner portions 301, 302, 303 and 304, respectively. For example, the sealing device may use the driver to move each of the first hot air blower 310 and the second air blower 320 from the position corresponding to the line A to a position corresponding to a line B. For another example, the sealing device may use the driver to move each of the third hot air blower 330 and the fourth air blower 340 from the position corresponding to the line A' to a position corresponding to a line B'. The foregoing positions are described as examples, and the positions may not be limited thereto.

The sealing device may control the driver or each of the hot air blowers 310, 320, 330 and 340 to adjust at least one of a temperature, pressure, or blow time of hot air blown by each of nozzles 312, 322, 332 and 342. For example, the sealing device may control the driver or each of the hot air blowers 310, 320, 330 and 340 to adjust the hot air temperature, pressure, or blow time required for sealing and satisfy conditions necessary for the sealing.

The sealing device may control the driver or each of the hot air blowers 310, 320, 330 and 340 to adjust a blow angle at which each of nozzles 312, 322, 332 and 342 blows the hot air. For example, the electrode assembly 100 may include long sides parallel to a first direction and short sides parallel to a second direction perpendicular to the first direction. The sealing device may control the driver or each of the hot air blowers 310, 320, 330 and 340 and adjust the blow angle of each of nozzles 312, 322, 332 and 342 so that the hot air is blown in a third direction in which an angle is formed with respect to the first direction and the second direction. For another example, the sealing device may control the driver or each of the hot air blowers 310, 320, 330 and 340 to adjust the blow angle of each of nozzles 312, 322, 332 and 342 so that the hot air is blown in a direction diagonal with respect to each of the plurality of corner portions 301, 302, 303 and 304.

The sealing device may control the driver to adjust (set) distances from the hot air blowers 310, 320, 330 and 340 to the plurality of corner portions 301, 302, 303 and 304, respectively. For example, the sealing device may control the driver to adjust a distance between the first hot air blower 310 and the first corner portion 301, a distance between the second hot air blower 320 and the second corner portion 302, a distance between the third hot air blower 330 and the third corner portion 303, a distance between the fourth hot air blower 340 and the fourth corner portion 304.

When there are preset distance values, the sealing device may control the driver so that the distances from the hot air blowers 310, 320, 330 and 340 to the plurality of corner portions 301, 302, 303 and 304 are the preset distance values, respectively.

The hot air blowers 310, 320, 330 and 340 may blow the hot air at specific positions close to the plurality of corner portions 301, 302, 303 and 304, respectively. For example, when the respective distances with the corner portions 301, 302, 303 and 304 and the respective blow angles of the nozzles 312, 322, 332 and 342 are adjusted, the sealing device may use the hot air blowers 310, 320, 330 and 340 to blow the hot air based on the set temperature, pressure, and blow time of the hot air, toward the corner portions 301, 302, 303 and 304, respectively.

The corner portions 301, 302, 303 and 304 may each include a portion of the separator 130, and the portion of the separator 130 may be sealed in a non-contact method by the hot air. For example, the portion of the separator 130 may be melted by the hot air, and the melted portion of the separator 130 may be pressed to seal each of the corner portions 301, 302, 303 and 304 of the electrode assembly 100.

As the sealing device performs the sealing in the non-contact method by using the hot air blowers 310, 320, 330 and 340, an impact or damage may be minimized which occurs at a portion other than an object to be sealed or a sealing region by physical contact during the sealing. According to situations, the sealing device may control the conditions for performing the sealing, such as the temperature, blow pressure, blow time, blow angle of the hot air, and the distances between the hot air blowers 310, 320, 330 and 340 and the corner portions 301, 302, 303 and 304, respectively. Accordingly, uniform and stable sealing quality may be adaptively secured.

Figure 5:
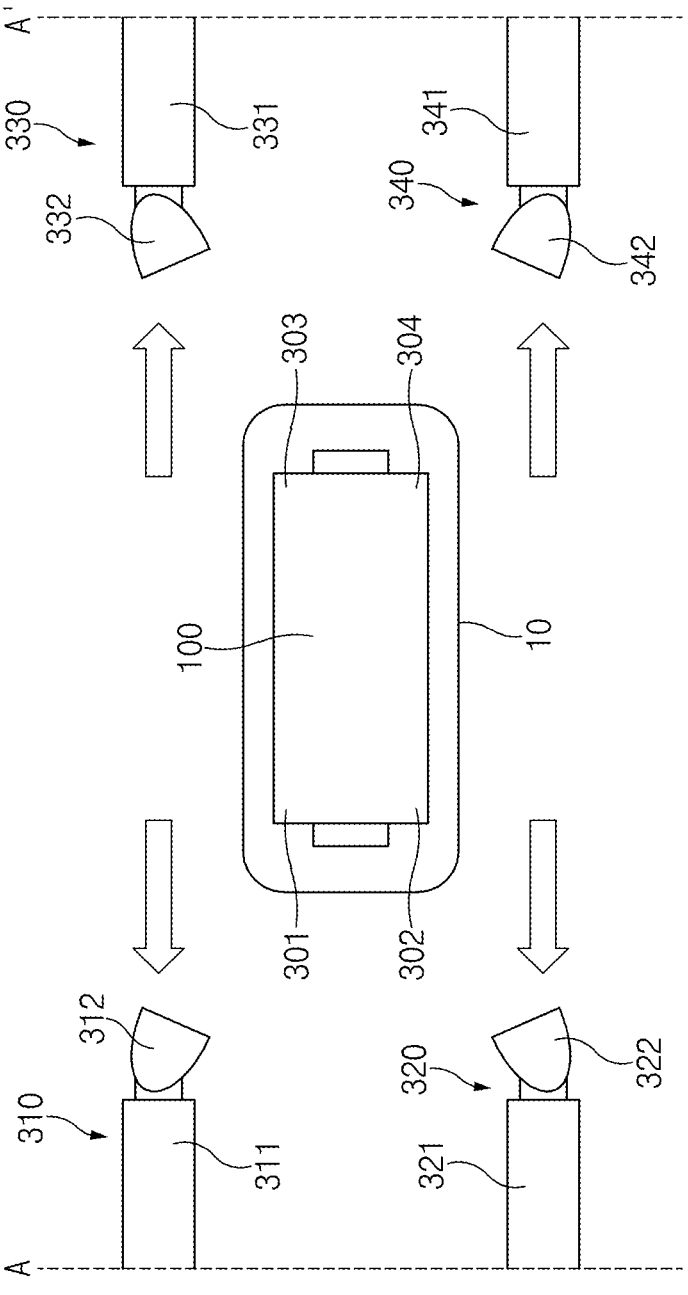
FIG. 5 is a view illustrating some processes of a method for sealing an electrode assembly according to an embodiment of the present invention.

FIG. 5 illustrates some processes of a method for sealing an electrode assembly according to an embodiment of the present invention.

A sealing device may control a driver to re-adjust (or re-set) distances from hot air blowers 310, 320, 330 and 340 to a plurality of corner portions 301, 302, 303 and 304, respectively. For example, the sealing device may control the driver to move the hot air blowers 310, 320, 330 and 340 to initial positions, respectively.

The sealing device may use the driver to move the hot air blowers 310, 320, 330 and 340 to be far away from the plurality of corner portions 301, 302, 303 and 304, respectively. For example, the sealing device may use the driver to move each of a first hot air blower 310 and a second air blower 320 from a position corresponding to a line B to a position corresponding to a line A. For another example, the sealing device may use the driver to move each of a third hot air blower 330 and a fourth air blower 340 from a position corresponding to a line B' to a position corresponding to a line A'.

The sealing device may control the driver to move the hot air blowers 310, 320, 330 and 340 from positions, which are close to the plurality of corner portions 301, 302, 303 and 304, to the positions (or standby positions), respectively, each of which corresponds to a standby line (e.g., the line A or the line A').

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

DESCRIPTION OF THE SYMBOLS

10: Nest
100: Electrode assembly
110: Negative electrode
120: Separator
130: Positive electrode
140: Negative electrode tab
141: Negative electrode lead
150: Positive electrode tab
151: Positive electrode lead
301: First corner portion
302: Second corner portion
303: Third corner portion
304: Fourth corner portion
310: First hot air blower
311: First main body
312: First nozzle
320: Second hot air blower
321: Second main body
322: Second nozzle
330: Third hot air blower
331: Third main body
332: Third nozzle
340: Fourth hot air blower
341: Fourth main body
342: Fourth nozzle

The invention claimed is:

1. A method for sealing an electrode assembly having a plurality of electrodes stacked alternately with a separator therebetween, the method comprising:

seating the electrode assembly on a nest; and sealing the electrode assembly by blowing hot air toward a corner portion of the electrode assembly, wherein the corner portion includes a portion of the separator, and wherein the step of sealing the electrode assembly includes melting the portion of the separator in the corner portion by the hot air.

2. The method of claim 1, wherein, during the step of sealing, a hot air blower comprising a nozzle is used to blow the hot air toward the corner portion.

3. The method of claim 2, wherein the hot air blower is configured to adjust at least one of a temperature, pressure, blow time, or blow angle of the hot air.

4. The method of claim 2, further comprising moving the hot air blower toward the corner portion of the electrode assembly by using a driver before the step of sealing.

5. The method of claim 2, wherein the electrode assembly comprises long sides parallel to a first direction and short sides parallel to a second direction perpendicular to the first direction, wherein the method further comprises adjusting a blow angle of the hot air with respect to the first direction and the second direction.

6. The method of claim 2, wherein the electrode assembly includes a plurality of corner portions, wherein each of a plurality of hot air blowers corresponds to each of the plurality of corner portions, respectively, for blowing hot air.

* * * * *